United States Patent [19]
Maurer

[11] Patent Number: 4,547,076
[45] Date of Patent: Oct. 15, 1985

[54] METHOD AND APPARATUS FOR MAKING SOFT-ICE IN SMALL QUANTITIES

[76] Inventor: Wilhelm Maurer, Talacherring 15, 8103 Unterengstringen, Switzerland

[21] Appl. No.: 709,845

[22] Filed: Mar. 11, 1985

Related U.S. Application Data

[63] Continuation of Ser. No. 536,775, Sep. 28, 1983, abandoned, which is a continuation-in-part of Ser. No. 366,773, Apr. 8, 1982, abandoned.

[30] Foreign Application Priority Data

| | | |
|---|---|---|
| Apr. 15, 1981 [CH] | Switzerland | 2521/81 |
| Jan. 26, 1982 [CH] | Switzerland | 466/82 |
| Mar. 10, 1982 [CH] | Switzerland | 1473/82 |

[51] Int. Cl.$^4$ .............................................. F25C 5/12
[52] U.S. Cl. ...................................... 366/244; 62/307; 62/320; 62/354; 74/841; 241/283; 241/DIG. 17; 366/255; 366/312; 474/73
[58] Field of Search ............... 62/320, 69, 70, 307, 62/308, 354, 342, 343; 366/98, 312, 244, 255; 241/283, 205, 199.7, 199.8.DIG. 17; 74/841; 474/73

[56] References Cited

U.S. PATENT DOCUMENTS

| | | | |
|---|---|---|---|
| 1,848,376 | 3/1932 | Murphy | 74/841 |
| 2,367,292 | 1/1945 | Le Tourneau | 74/841 |
| 2,477,474 | 7/1949 | Bert | 62/320 X |
| 2,546,739 | 3/1951 | Georeina et al. | 241/DIG. 17 |
| 2,566,084 | 8/1951 | Esseling | 74/841 |
| 2,615,683 | 10/1952 | McCallum | 74/841 |
| 3,738,619 | 6/1973 | Shirae | 366/312 X |
| 4,205,535 | 6/1980 | Maurer | 62/342 |

*Primary Examiner*—William E. Tapolcai
*Attorney, Agent, or Firm*—James E. Nilles

[57] ABSTRACT

Soft-ice mixture, consisting of water or milk and commercially available powder, is frozen solid in a cylindrical container, then presented to a machine whereby the container is pressurized and which has an agitator that engages the surface of the solid to exert force along a narrow zone, whereby the material is locally melted. The momentarily melted material is immediately whipped by the agitator, before it refreezes. The agitator rotates at high speed (2,000 rpm) but advances into the material very slowly. For such action the agitator shaft is surrounded by an outer driver confined to rotation in one direction, with which the shaft has a splined connection, and the shaft in turn surrounds a threaded inner driver, with which the shaft has a threaded connection. For driving the agitator downward the inner driver is rotated in said direction, but slower than the outer driver; for driving it upward the inner driver is also rotated in said direction, but faster than the outer driver. Mechanism is described for automatic reversal of axial shaft movement and for automatic shut-off at the end of a cycle.

10 Claims, 14 Drawing Figures

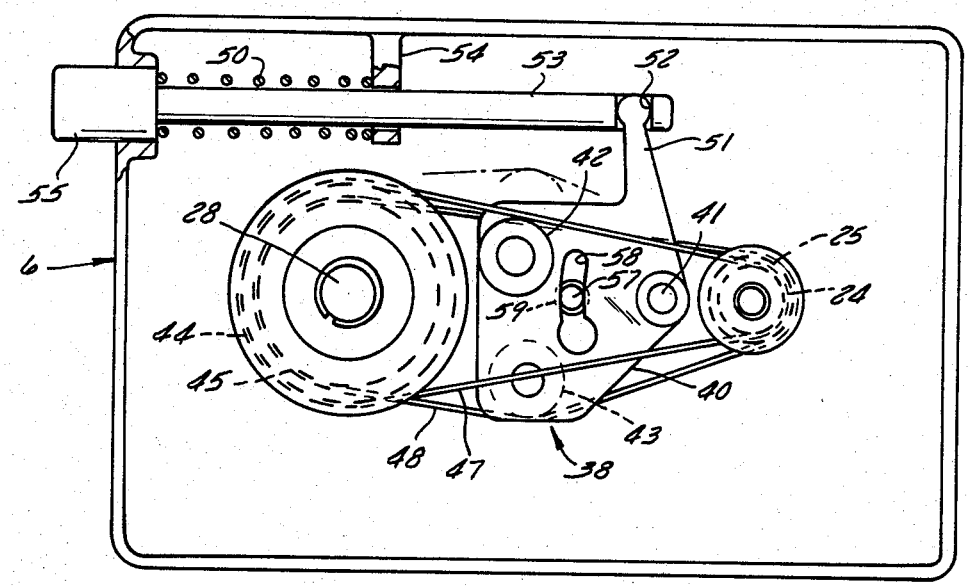
FIG. 12
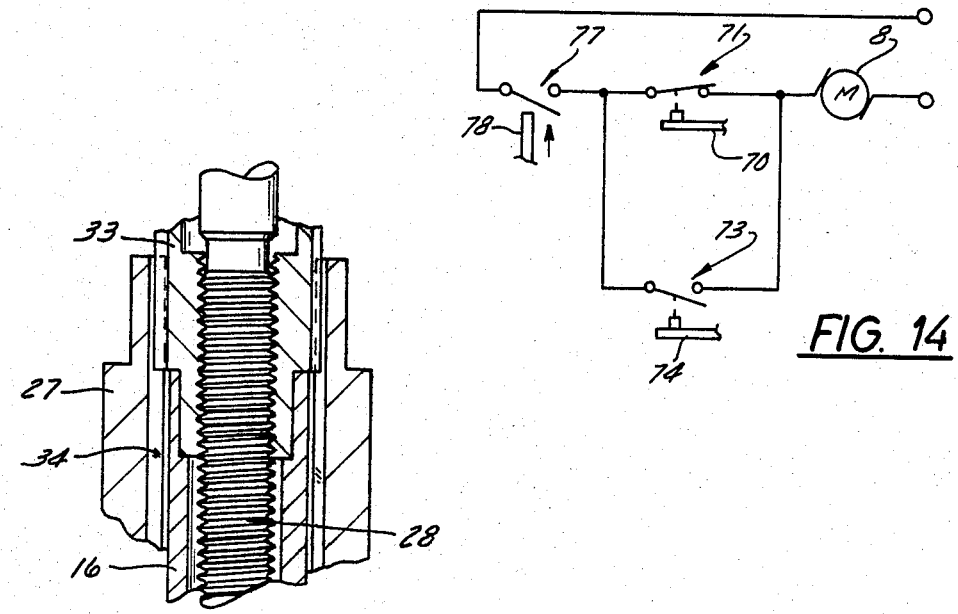
FIG. 13
FIG. 14

METHOD AND APPARATUS FOR MAKING SOFT-ICE IN SMALL QUANTITIES

This application is a continuation of application Ser. No. 536,775, filed Sept. 28, 1983, now abandoned, which is a continuation-in-part of U.S. Ser. No. 366,773, filed Apr. 8, 1982, now abandoned.

FIELD OF THE INVENTION

This invention relates to a process and apparatus for making soft-ice and similar frozen desserts and is more particularly concerned with a process and apparatus that is especially suitable for domestic use, whereby individual servings of soft-ice can be prepared immediately before consumption, the apparatus being very compact and embodying a novel driving transmission whereby a shaft that rotates at a constant speed in one direction and is driven by a motor that similarly rotates at a constant speed in one direction is caused to advance slowly through a predetermined distance in one axial direction and then to retract more rapidly in the other axial direction.

BACKGROUND OF THE INVENTION

Soft-ice is a frozen whipped product generally similar to ice cream, but made with water or skimmed milk mixed with a flavoring preparation. Materials for soft-ice mixes, usually in powder form, are commercially available in a variety of flavors. Because soft-ice is lower in calories and cholesterol than true ice cream, it is favored by many persons who are on restricted diets or who are concerned about their diets.

Heretofore, soft-ice has mainly been prepared with the use of large and expensive apparatus that simultaneously whips and freezes the mixed material. Such apparatus is suitable for making the product in large batches and is not adapted to being scaled down to a size suitable for domestic use. Furthermore, soft-ice does not keep well, and therefore those who wish to enjoy it must usually eat it at the place where it is made.

There have been prior efforts to provide a small domestic appliance for making soft-ice, as shown for example, by Swiss Pat. No. 624,278. Usually, an essential feature of such prior machines was a means for cooling the soft-ice mix to solidify it by freezing. In commercial scale machines this function was performed by a refrigeration cooling unit, but in domestic appliances, wherein compactness and low cost are important, cooling was usually effected by means of a cold pack such as a water-salt mixture that was frozen in a deep freezer or a refrigerator before being loaded into the soft-ice machine.

In practice it has been found that domestic soft-ice machines that rely on a cold pack do not enable the user to produce a uniform, good quality soft-ice at all times. Furthermore, such machines are neither compact nor convenient to use.

An alternative to freezing the soft-ice mixture during whipping is to freeze it before whipping, as suggested in U.S. Pat. No. 3,738,619, to Shirae. This means that the mixture is frozen (as in a deep freezer) into a hard, solid chunk having about the consistency of an ice cube, and is presented to an agitator which comminutes and whips the frozen material. It is perhaps not surprising that prior apparatus operating on this principle has tended to produce a rather poor quality product which, at best, contained a sprinkling of hard, ice-like granules and which was practically never a uniformly smooth whipped product.

Freezing the soft-ice mix before it is whipped offers several important advantages, provided the frozen mass can be converted into a dessert that has the consistency of good quality ice cream. The frozen mixture can be stored indefinitely in a freezer, in compact one-serving containers, to be whipped immediately before consumption. Thus, mixing of the material can take place at any convenient time, and whipping can be accomplished with a compact and relatively inexpensive appliance that need not incorporate refrigeration apparatus nor provision for a cold pack. Of course, the crucial factor is the provision of a method and means for whipping the frozen mix, whereby a uniformly smooth and non-granular whipped product is consistently produced; but heretofore the art has not known how to accomplish this.

It has been found that one element needed for the purpose is an agitator or comminuting device that will move rapidly across the surface of the frozen chunk of material, as by rotation, and at the same time advance very slowly into the frozen material, so that the material is processed little by little, but very thoroughly and completely. The need for producing this type of agitator motion poses the problem of providing a simple, compact and inexpensive mechanism for accomplishing it. The above mentioned U.S. Patent to Shirae discloses apparatus wherein manual force was applied to a rotating agitator to advance it axially into the body of ice. Since the manual force applied to the agitator was indeterminate and variable, the quality of the finished product tended to be dependent upon the skill, experience and luck of the operator. Apparently the patentee did not appreciate that rotational speed of the agitator and rate of its axial advance are parameters that are critical to the attainment of a uniformly smooth product, and it also appears that the provision of automatic means for axially advancing the agitator was not obvious to the patentee.

The problem of providing for exactly the required movement of the agitator is further complicated by the desirability of providing an automatic operating cycle for the mechanism, whereby the agitator will be retracted from the container when the operation is completed. Preferably, too, the motor that drives the agitator should be automatically shut off at the end of the operating cycle, to conserve energy, prevent excessive working of the whipped product, and serve as a signal that processing is completed. In a household appliance, these objectives must necessarily be achieved in apparatus that is compact and inexpensive but is nevertheless sturdy and easy to clean as well as simple to operate.

Although the configuration of the agitator and its rates of rotation and axial advance have been found to be important, they are not the only factors involved in the achievement of a satisfactory soft-ice, and the present invention involves, in part, the discovery of a further critical factor.

SUMMARY OF THE INVENTION

The general object of this invention is to provide a process and apparatus for consistently producing uniformly smooth and non-granular soft-ice dessert from a liquid mixture that has been frozen in a container to substantially the consistency of a chunk of ice, so that the mixture can be mixed at any convenient time, stored in a freezer for as long as desired, until shortly before it is to be consumed, and then processed in a very few moments to convert it to a product that compares favorably to high quality ice cream with respect to texture as well as flavor.

Another general object of this invention is to provide a compact, inexpensive and automatically operating domestic appliance for producing soft-ice, not requiring the incorporation of refrigeration apparatus or provision for a cold pack but instead capable of processing solidly frozen soft-ice mix and converting it to a smooth, uniform whipped product.

A more specific object of this invention is to provide a domestic soft-ice machine which can be operated by inserting thereinto a container holding a solidly frozen body of soft-ice mix and pressing a starting button, the machine being so arranged as to progress through an operating cycle in which the material is processed to a soft-ice comparable in quality to the best product made with commercial soft-ice machines, and to shut itself off automatically at the end of the cycle.

A further specific object of this invention is to provide a simple, compact, reliable and inexpensive mechansim whereby an instrumentality such as an agitator is driven for rotation in one direction at a constant rate, by a motor which likewise rotates in one direction and at a constant rate, and whereby that instrumentality, as it rotates, is advanced at a constant, very slow rate in one axial direction, through a predetermined distance, and then, while still rotating in said one direction, is axially retracted through the same distance at a selected rate which can be substantially faster than its rate of advance.

Another specific object of this invention is to provide a domestic soft-ice machine of the character described that is powered by a single relatively small electric motor and wherein the motor, in addition to driving an agitator which processes frozen soft-ice mixture, also drives a small air pump that injects pressurized air into the material being processed, to produce a whipped product having a uniformly smooth texture.

In general, these and other objects of the invention that will appear as the description proceeds are achieved in the method and apparatus of this invention, whereby a solidly frozen body of material, consisting, for example, of water or milk mixed with a commercially available soft-ice preparation in accordance with instructions supplied with that preparation, is converted into a smooth frozen and whipped product that generally resembles ice cream.

Considered in its process aspect, this process for making soft-ice is characterized by exposing a body of frozen, substantially solid soft-ice mix that is at a temperature substantially below its freezing point to pressurized gas; and while said body is in the presence of said gas, applying force to said body along an elongated narrow zone that moves through the body transversely to the length of said zone in a succession of closely adjacent planar sweeps, said force being of sufficient magnitude and so directed as to cause material in said zone to be momentarily melted and agitated and thus mixed with said gas.

The apparatus of this invention for making soft-ice comprises a container having a substantially cylindrical interior, said container being open at one end thereof and adapted to be partially filled with soft-ice mix that is frozen to a body of substantially solid and unfrothed material spaced from said end thereof. The machine further comprises means for mounting said container in coaxial relation to a shaft; means for effecting relative high speed rotation and low speed axial advance between said shaft and the container; and elongated bladelike scraping and agitating means carried by said shaft and extending radially therefrom, having a radius substantially equal to the inside radius of the container, and having a substantially thin leading edge whereby localized force is applied to frozen material in the container in consequence of relative rotation and axial advance between said shaft and the container, which force momentarily melts said material in a moving zone adjacent to said leading edge that progresses through the body of material, and having agitator portions behind said leading edge whereby momentarily melted material is deflectingly agitated. The machine further comprises sealing means removably securable across said one end of the container and surrounding said shaft to provide a substantially gas tight closure for the container, and means for forcing gas under pressure into the interior of the container when the same is closed, for mixing with momentarily melted material during agitation thereof.

Further important aspects of the invention will appear from the following description.

BRIEF DESCRIPTION OF DRAWINGS

In the accompanying drawings, which illustrate what is now regarded as a preferred embodiment of the invention:

FIG. 12 is a view looking downward from just below the top wall of the housing;

FIG. 13 is an enlarged detail view in vertical section through the upper end portion of the agitator shaft, showing its connections with the drivers; and FIG. 14 is a circuit diagram showing how the several switches are connected with the motor.

DETAILED DESCRIPTION OF PREFERRED EMBODIMENT OF THE INVENTION

Figure 1:
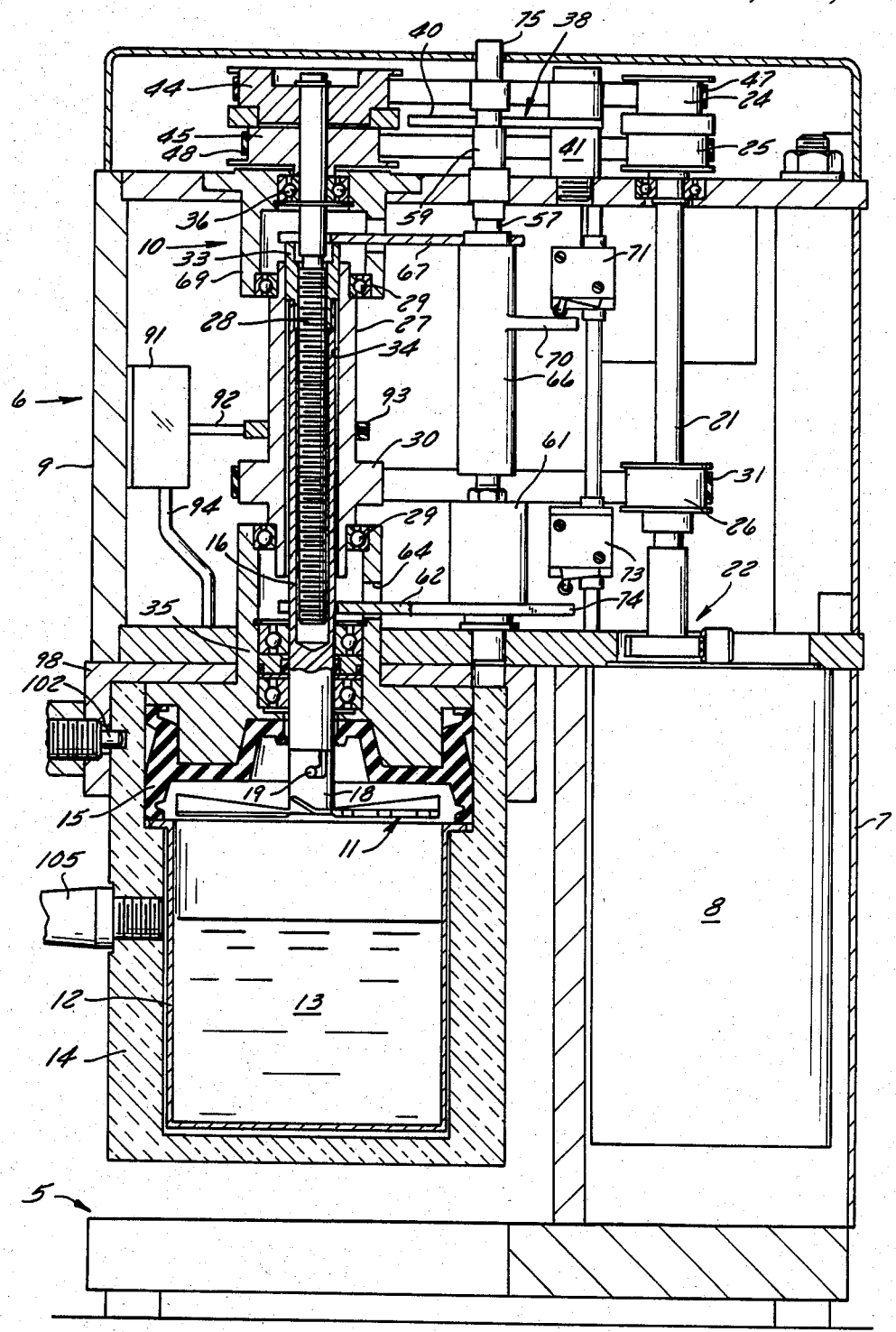
FIG. 1 is a view in vertical section through a soft-ice machine that embodies the principles of this invention.

A soft-ice machine that embodies the principles of this invention comprises a base 5 that supports a housing 6 of inverted L-shape, having a narrow lower compartment 7 wherein there is an electric motor 8 and a wider upper compartment 9 wherein there is a transmission mechanism 10 through which the motor drives a substantially cruciform agitator 11. The wider upper compartment 9 projects over a portion of the base 5 to provide a bay for reception of a cylindrical cup-like container 12 that holds a solidly frozen body 13 of soft-ice mixture to be processed by means of the machine. To facilitate freezing of the mixture, the container 12 is preferably one that conducts heat readily; but to prevent the frozen mixture from picking up heat from the ambient air during the time it is being processed in the machine, the container 12 is preferably inserted into a closely fitting cup-like holder 14 of heat insulating material, which has its upper end formed for readily releasable connection with the underside of the upper housing compartment 9. When the holder 14 is installed on the machine, an annular resilient sealing member 15 that is fixed to the housing is closely received in its upper portion, and that sealing member bears against the upper surface of a radially outwardly projecting flange around the rim of the container 12 to provide an airtight seal that enables the interior of the container to be pressurized as explained hereinafter.

The cruciform agitator 11 has arms that project radially relative to a rotary shaft 16 by which the agitator is carried and which is coaxial to the container 12 when the latter is installed on the housing. The agitator 11 has a radius only slightly smaller than the inside radius of the cylindrical container 12, so that substantially all material in the container is acted upon by the rotating agitator as processing takes place.

The body 13 of material in the container 12 can be a mixture of milk or water with a soft-ice powder such as is commercially available in many flavors, mixed before freezing in accordance with instructions supplied with the powder. The container 12 is only partially filled with the liquid mix, to leave room for overrun, and it is kept in a freezer until it is placed in the machine 8 to be whipped just before serving.

With a container 12 and its holder 14 in place, the motor 8 is started, and through the transmission mechanism 10 the shaft 16 is driven to rotate the agitator 11 at relatively high speed while at the same time advancing it slowly but steadily downwardly in the container 12 and through the body 13 of frozen material. This downward advance continues through a predetermined distance, to bring the agitator 11 to a position in which it is rotating just above the bottom of the container 12; and then, while the agitator continues to rotate in the same direction and at the same relatively high speed, the shaft 16 and the agitator move back up to the starting position shown in FIG. 1, wherein the agitator is at a level above the rim of the container. At that point the motor 8 is automatically stopped. The holder 14 can then be released from the machine, and if desired the product can be eaten directly from the container 12, which is preferably of a size appropriate for a single serving. The whole operation is accomplished in a time period on the order of 60 to 90 seconds, so that several servings can be processed within a relatively short time.

The cruciform agitator 11, itself, which is described hereinafter, is preferably made as a unitary stamping, suitably of stainless steel. It is permanently secured to a coaxial upwardly projecting hub 18 that has a concentric upwardly opening well wherein a bottom portion of the shaft 16 is closely receivable. To facilitate cleaning, the agitator 11 should be readily removable from the shaft 16, and to this end the agitator shaft has, near its bottom end, a radially projecting tang 19 that is receivable in an L-shaped slot in the hub 18 to provide a bayonet connection. Because the agitator 11 is always driven for rotation in one direction, the bayonet connection is securely maintained when the machine is in operation, notwithstanding the ease with which the agitator can be removed from the shaft 16.

Turning now to the means by which the agitator 11 is driven for rotation and for axial downward and upward motion through a predetermined stroke distance, there is an upright driving shaft 21 in the upper portion 9 of the housing, just above the motor 8, that is confined to rotation and is driven from the motor 8 through a reduction gear connection 22. Coaxially fixed to an upper portion of this driving shaft 21 are two axially adjacent belt driving pulleys 24, 25, the upper pulley 24 being of smaller diameter than the lower one 25. To a middle portion of the driving shaft 21 another belt driving pulley 26 is coaxially secured.

In the overhanging part of the upper housing portion 9, concentric with the mounting for the container 12, there are three coaxial shafts, namely, a tubular outer driver 27 that is confined to rotation, the agitator shaft 16 itself, which is surrounded by the outer driver 27 and which is constrained to rotate with the outer driver as well as being axially slidable relative to it, and an inner driver 28 which, like the tubular outer driver 27, is confined to rotation. The agitator shaft 16 is tubular along at least a major portion of its length to receive the inner driver 28.

Considering first the tubular outer driver 27, it is confined to rotation in bearings 29 near its top and bottom ends that are suitably fixed in the upper housing compartment 9. Its length is a little less than the length of the axial stroke of the agitator shaft 16. The outer driver 27 is driven for its rotation by means of a belt pulley 30 that is integrally formed on its medial portion, opposite the pulley 26 on the medial portion of the driving shaft 21, and a belt 31 connects those pulleys 26 and 30 so that the outer driver 27 rotates at all times that the motor 8 is in operation, at a constant speed and always in the same direction.

The tubular agitator shaft 16 has a coaxial, nut-like upper end portion 33 which is preferably made as a separate part that is securely fixed to the shaft 16 itself. This nut-like portion 33, which has a larger outside diameter than the remainder of the shaft 16, comprises a male spline element that is cooperable with lengthwise extending spline grooves 34 in the interior of the tubular outer driver 27 to provide a spline connection whereby the agitator shaft 16 is constrained to rotate in unison with the outer driver 27 but it is slidable up and down along the full length of the outer driver. Preferably a bushing member 35 is fixed in the housing 6, below the bottom of the outer driver 27 and above the annular seal 15, through which the agitator shaft 16 extends and which provides a seal around it as well as steadying it in its rotational and axial motion to maintain it coaxial with the outer driver 27.

Axial motion is imparted to the agitator shaft 16 by means of the threaded inner driver 28, which extends downwardly in the tubular portion of the agitator shaft and has its upper end near the top of the housing and its lower end at a level below the bottom of the outer driver 27. The inner driver 28 is mounted in a bearing 36 that is carried by the housing 6 and is located a short distance above the tops of the agitator shaft 16 and the outer driver 27. From its bottom end up to about the level of the top of the outer driver 27, the inner driver 28 has a constant-pitch thread along its length, and the interior of the nut-like upper portion 33 of the agitator shaft 16 has a mating internal thread, so that axial motion is imparted to the agitator shaft 16 in consequence of relative rotation between it and the threaded inner driver 28.

To the upper end portion of the inner driver 28, above its bearing 36, two driven belt pulleys 44 and 45 are coaxially secured, the upper pulley 44 being of larger diameter than the lower pulley 45. The larger upper pulley 44 on the inner driver 28 is opposite the smaller upper pulley 24 on the driving shaft 21 and is connectable with it by means of a belt 47, while the lower pulley 45 is opposite the driving shaft pulley 25 and is connectable with it by means of a belt 48. The belts 47 and 48 are normally slack around their respective pulley pairs 24, 44 and 25, 45, and each belt can be tensioned into driving engagement with its pulleys by means of a belt tensioning device 38 that is described in detail hereinafter.

At this point it is sufficient to note that the belts 47 and 48 are tensioned alternatively. It should also be noted that both of the belts 47, 48 drive the inner driver 28 for rotation in the same direction as the outer driver 27 and the agitator shaft 16, and that relative rotation between the agitator shaft 16 and the inner driver 28 is due to a difference between their speeds. Thus, the agitator shaft 16 moves down when the belt 47 is tensioned because the threaded inner driver 28 then rotates slower than the agitator shaft 16, owing to the diameters of the pulleys 24, 44 with which the belt 47 is engaged, in their relationship to one another and to the diameters of the pulleys 26, 30 by which the agitator shaft 16 is rotatably driven. It will be understood that the speed relationship between the threadedly connected shafts 28, 16 is so related to the pitch of the screw thread that downward movement of the agitator shaft 16 takes place at a predetermined slow rate.

The diameters of the pulleys 25, 45 are so related to one another and to the diameters of the pulleys 26, 30 by which the agitator shaft 16 is driven that when the belt 48 is tensioned on said pulleys 25, 45, the inner driver 28 is rotated at a faster speed than the agitator shaft 16, and the agitator shaft 16 is therefore moved upward. In this case the pulley diameter relationship is preferably so selected that upward movement of the agitator shaft 16 is substantially faster than its downward movement.

The belt tensioning device 38 (FIG. 12) comprises a plate 40 which is mounted on a fixed pivot 41 in the upper portion of the housing for edgewise swinging about an upright axis and which carries a pair of idler pulleys 42 and 43 that are spaced apart in the direction of its swinging motion. A spring 50 is so connected with the plate 40 and the housing 6 as to urge the plate to swing to an agitator raising position in which the idler pulley 43 engages the belt 48 and tensions it around the pulleys 25, 45, for rotating the inner driver 28 at its faster speed.

As shown, the plate 40 has an integral edgewise projecting actuating arm 51 that is engaged in a transverse slot 52 in the rear portion of an axially slidable shaft 53, and the spring 50 is a compression spring that is piloted around that shaft 53 to react between a bracket 54 in the housing, by which the shaft 53 is axially slidably carried, and an enlarged diameter front end portion 55 on the shaft 53. The enlarged diameter front end portion 55 of the slide shaft 53 comprises a pushbutton which is normally exposed at the exterior of the housing 6 and which can be pushed in against the bias of the spring 50 to swing the belt tensioner plate 40 to an agitator lowering position in which the idler pulley 42 engages the belt 47 to tension it for downward motion of the agitator shaft 16. Inward actuation of the pushbutton 55 also causes energization of the motor 8 through mechanism described hereinafter.

When the pushbutton 55 is pushed in and the tensioner plate 40 is thereby swung to its agitator lowering position, the plate 40 is automatically latched in that position, and it remains so latched until the agitator shaft 16 has completed its downward movement, whereupon the plate 40 is automatically released, to be swung by the spring 50 to its agitator raising position. The mechanism for effecting this automatic latching and release comprises an upright control shaft 57 that is mounted in the housing for axial up and down motion and is biased upward. An upper end portion of the control shaft 57 projects up through an arcuate keyhole-shaped slot 58 in the tensioner plate 40, which slot is spaced from the pivot 41 about which that plate swings and is curved concentrically thereto. At a small distance below its upper end the control shaft 57 has an enlarged diameter latching portion 59 that normally engages the underside of the tensioner plate 40, being too large to pass through the main part of the slot 58 therein; but when the plate 40 is manually actuated to its agitator lowering position, this latching portion 59, in response to the upward bias on the control shaft 57, snaps into the large diameter end portion of the slot 58 and thereby holds the plate in that position, against the bias of the spring 50. At the end of the downward stroke of the agitator shaft 16, the control shaft 57 is moved downward against its bias, withdrawing its latching portion 59 from the slot 58 and thus freeing the plate 40 to swing to its agitator raising position under the bias of spring 50.

Figure 2:
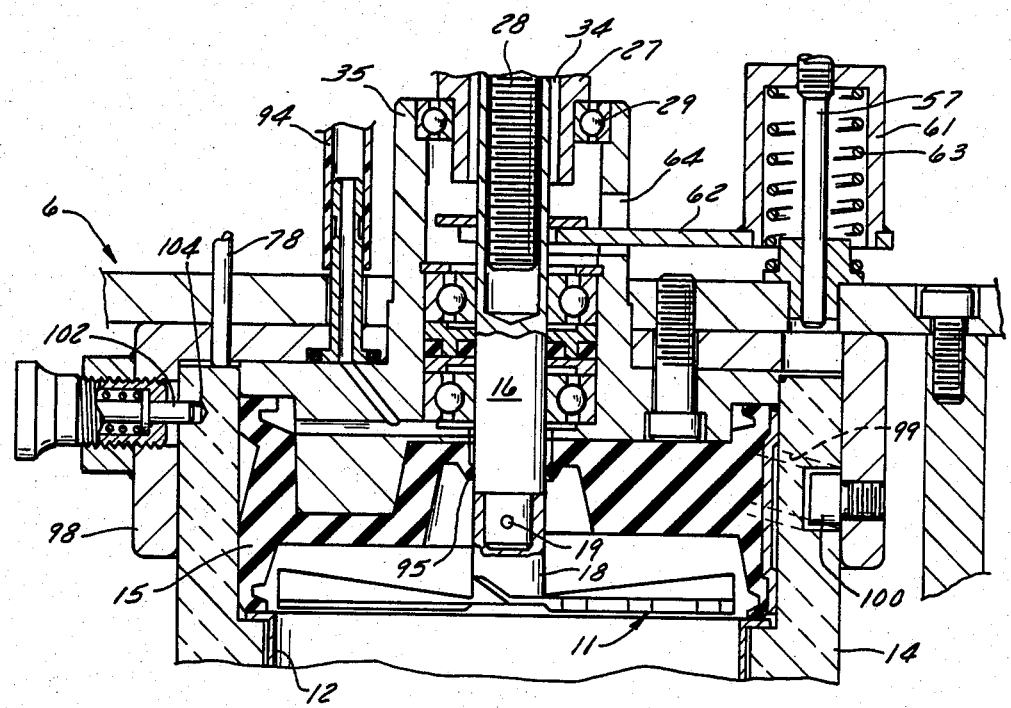
FIG. 2 is a detail view in vertical section, taken on substantially the same plane as FIG. 1 but on a larger scale, showing parts of the machine in the general neighborhood of the connection between the container holder and the upper portion of the housing.

Fixed to the control shaft 57 at a small distance above its lower end is an abutment carrier 61 (FIG. 2) which has a laterally projecting abutment arm 62 and which provides a seat for the upper end of a compression spring 63 that surrounds the control shaft 57 and biases it upward. The lower end of the spring 63 reacts against a part of the housing that defines an upwardly opening well wherein the bottom end portion of the control shaft 57 is slidably received. The outer end of the abutment arm 62 is below the outer driver 27 and is bifurcated to provide a slot through which the agitator shaft 16 extends downward with substantial clearance. As the agitator shaft 16 nears the bottom of its stroke, its nut-like upper portion 33 emerges from the bottom of the outer driver 27 and engages the bifurcated end of the abutment arm 62, driving down the abutment carrier 61 and the control shaft 57 to which it is attached, thus disengaging the latching portion 59 from the slot 52 in the tensioner plate 40 and allowing the tensioner plate to swing to its agitator raising position. The abutment arm 62 extends through a vertically elongated slot 64 in a part of the housing, and the vertical edges of this slot prevent the abutment arm from swinging about the control shaft 57 to a position in which its bifurcated end portion could drag against the agitator shaft 16. The upper end of the slot 64 is engaged by the abutment arm 62 to define the highest position to which the control shaft 57 is biased by its spring 63.

Figure 3:
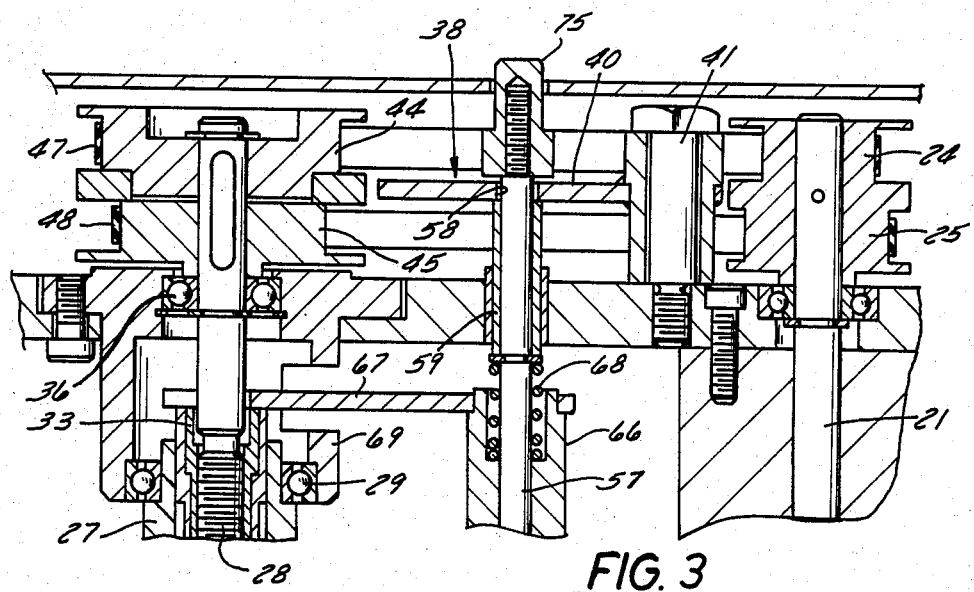
FIG. 3 is a detail view in vertical section, taken on substantially the same plane as FIG. 2 but showing portions of the machine near the top of its housing.
Figure 4:
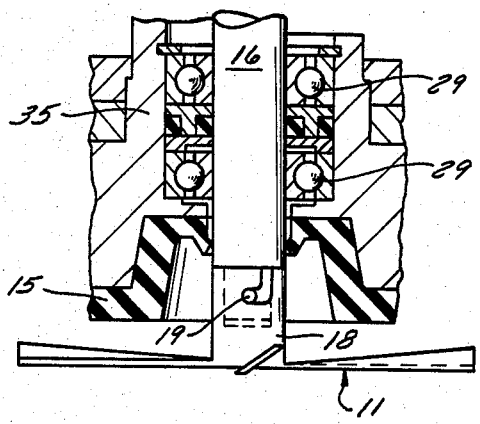
FIG. 4 is a detail view in vertical section showing the agitator and a bottom portion of its shaft.
Figure 7:
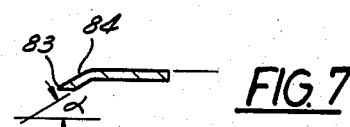
FIGS. 7-11 are views in section through the agitator, taken on the planes of the respective lines 7—7, 8—8, 9—9, 10—10 and 11—11 in FIG. 6.
Figure 8:
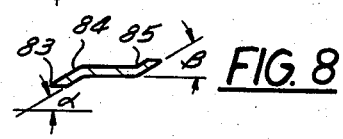
Figure 9:
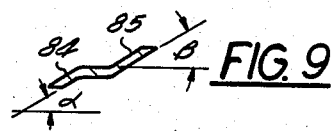
Figure 10:
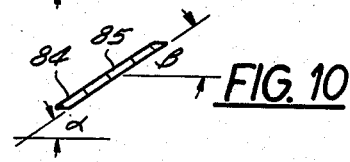
Figure 5:
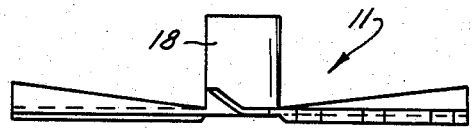
FIG. 5 is a side view of the agitator itself, rotated 90° to its position shown in FIG. 4.
Figure 11:
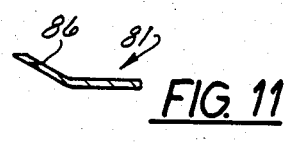

For automatically shutting off the motor 8 when the agitator 11 has returned to the top of its stroke, an upper abutment carrier 66 (FIG. 3) is slidably mounted on the control shaft 57 for limited up and down motion relative to it. The upper abutment carrier 66 has a laterally extending abutment arm 67 that projects across the top of the outer driver 27 and has a bifurcated outer end portion defining a slot through which the inner driver 28 extends with substantial clearance. A compression spring 68 that surrounds the control shaft 57 reacts between its latching portion 59 and the upper abutment carrier 66 to bias the latter downward relative to the control shaft, towards a position in which its abutment arm 67 rests on a bracket 69 that carries the upper bearing 29 for the outer driver 27. The upper abutment carrier 66 has an actuating arm 70 which projects laterally substantially at right angles to its abutment arm 67 and which actuates a shutoff switch 71 that is fixed in the housing at a location just above the path of said actuating arm 70. The shutoff switch 71 is connected between an electrical main terminal M (FIG. 14) and the motor 8 and is normally closed to provide for energization of the motor; but as the nut-like upper portion 33 of the agitator shaft 16 rises to the top of its stroke and emerges from the top of the outer driver 27, it engages the upper abutment arm 67, lifting the upper carrier 66 so that its actuating arm 70 opens the shutoff switch 71, thereby turning off the motor 8.

Of course, the motor 8 cannot be energized through the shutoff switch 71 as long as the agitator shaft 16 remains in its fully raised position, and therefore the motor energizing circuit also includes a normally open motor starting switch 73 that is connected in shunt with the shutoff switch 71 (see FIG. 14) and is mounted in the housing at a fixed location spaced below the shutoff switch 71. The lower abutment carrier 61 has a laterally projecting actuating arm 74 that extends at an angle to its abutment arm 62 and cooperates with the actuator of the starting switch 73. When the control shaft 57 is in its lowered position, as is normally the case after the agitator shaft 16 has reached the bottom of its stroke and while the machine is not operating, the actuating arm 74 of the lower abutment carrier 61 is spaced below the actuator of the starting switch 73, and that switch therefore remains open. When the control shaft 57 moves up at the start of an operating cycle, upon manual actuation of the tensioner plate 40 to its agitator lowering position, the lower actuating arm 74 moves up with it, closing the starting switch 73 for energization of the motor 8. It will be seen that there is an interval during descent of the agitator 11, after the nut-like portion 33 of the agitator shaft 16 moves down into the outer driver 27 and until it pulls the control shaft 57 down to its lowered position, when both of the switches 71 and 73 are closed.

If the agitator 11 is in its downward movement and it produces an unusual noise, such as could be caused by foreign matter embedded in the frozen body 13 in the container 12, it can be cause to start rising immediately by manually forcing the control shaft 57 to its lowered position. For that purpose the upper end portion of the control shaft 57 preferably projects above the top wall of the housing 6 to provide an emergency pushbutton 75.

To prevent the motor 8 from running when no container 12 is in place to guard the agitator 11, a normally open safety switch 77 is connected in series with the parallel-connected switches 71, 73. This safety switch 77 is actuated by an upright pin 78 that is endwise slidable in the housing and normally has its bottom end portion projecting down from the underside of the housing to be engaged by the rim of the insulating container holder 14. Locking the holder 14 in place raises the pin 78, the upper end of which then bears against the actuator of the safety switch 77 to hold that switch closed so long as the holder 14 remains in place.

When the machine is operated, the quality of the finished product is dependent upon the configuration of the agitator 11, the speed at which it moves across the surface of the body 13 of frozen mix, and the rate at which it advances downward into that body.

Figure 6:
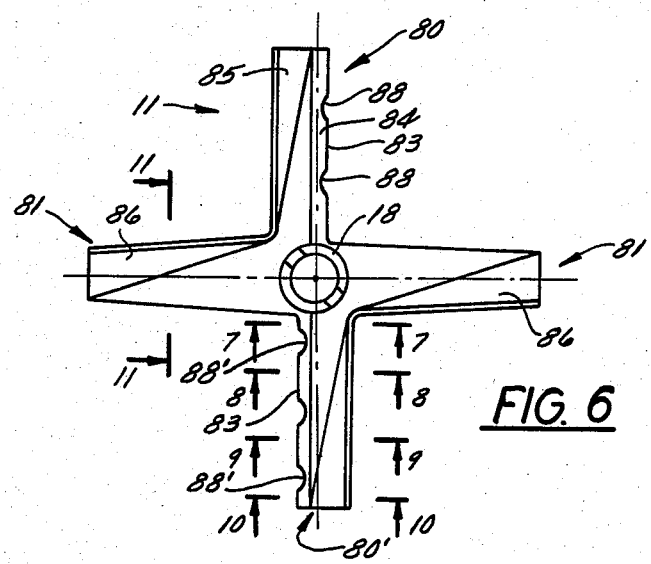
FIG. 6 is a plan view of the agitator.

FIGS. 4–11 illustrate a form that has been found to be functionally advantageous for the agitator 11 and which is suitable to be made as a unitary stainless steel stamping. In general, the agitator 11 is cross-shaped in planform, as best seen in FIG. 6, having a pair of radially opposite scraping arms 80 and a pair of radially opposite agitating arms 81 that extend at right angles to the scraping arms 80.

It has been found to be of little or no importance whether the leading edges 83 of the scraping arms are blunt or very sharp. Although the leading edge engages the frozen body 13 with a kind of scraping action, the rate at which the agitator 11 advances downward into the frozen material is such that no substantially large particles are dislodged from the body. Apparently the leading edge 83 of each scraping arm exerts a high localized force upon the frozen material whereby it is locally melted, in the same manner that the concentrated force exerted by an ice skate blade causes a film of water to form directly under the blade. Directly behind its leading edge 83, extending all along that edge and to a small distance rearward from it, each scraping arm 80 has an upwardly and rearwardly inclined front deflector portion 84 whereby the mixture liquefied by the leading edge 83 is immediately driven upward, out of contact with the body of still-frozen material. As shown in FIGS. 6–10, the positive angle $\alpha$ of the front deflector portion 84 is substantially constant along the length of the arm.

The trailing portion 85 of each scraping arm 80 is inclined rearwardly and upwardly at an angle $\beta$, which angle can increase radially outwardly along the arm or can be constant along its length. As here shown, the width of the upwardly inclined trailing portion 85 of each scraping arm 80 increases from zero near the root of the arm (FIG. 7) to substantially the full width of the arm at its tip (FIG. 10), where the inclined trailing portion 85 is a virtual continuation of the inclined front deflector portion 84. It will be seen that the material removed from the surface of the frozen body by each scraping arm 80 is thrown upward with considerable force, and is subjected to a downward force by the next following agitating arm 81.

Each of the agitating arms 81 (FIG. 10) has a leading or front portion 86 which is upwardly and forwardly inclined—i.e., inclined oppositely to the front deflector portions 84 of the scraping arms 80—although the angle at which that leading portion is inclined can be equal to the angle $\alpha$ of the scraping arm front portions 84. Because of the opposite direction of inclination of the front portions 84 and 86 of the scraping arms 80 and the agitating arms 81, respectively, the scraping arms 80 are downwardly offset relative to the agitating arms 81 (see FIG. 5), preferably by about 2 mm., so that the surface of the frozen body 13 is not engaged by the agitating arms 81. The front portion 86 of each agitating arm 81, owing to its rearward and downward inclination, tends to impart a downward force to material that it encounters, thus cooperating with the upward deflecting force produced by the scraping arms 80 to create intensive turbulence in the zone just above the frozen body 13 of material, thereby affording a good whipping action.

Because of the prevailing low temperature of the surrounding material, the temporarily liquefied mixture acted upon by the agitator 11 is refrozen immediately after being whipped.

To distribute the work load evenly between the two scraping arms 80, 80' their respective leading edges 83 have forwardly opening notches or bays 88, 88' at intervals along them, and the notches 88 in the arm 80 are spaced at different distances from the agitator axis than the notches 88' in the arm 80'. The sum of the widths of all of the notches 88, 88' in the two scraping arms—taking "width" as the distance across the notch in the direction lengthwise of the arm—should not exeed the length of one arm 80. The notches 88, 88' ensure that both of the scraping arms 80, 80' will have substantially constant engagement with the frozen body, thus preventing the work load from being imposed upon only one of those arms and minimizing the bending force that the agitator 11 applies to its shaft 16.

It has been found that best results are obtained when the agitator 11 is rotated at a rate such that the average circumferential speed (measured at the midpoint along the length of an arm 80, 81) is 1.7 to 5.3 m/sec. Below this the soft-ice is of much inferior quality; above this, the soft-ice becomes too soft. A suitable speed of agitator rotation is 2,000 rpm.

The distance that the agitator advances downward per revolution has also been found to bear upon the quality of the finished product. An optimum advance per revolution is 0.02 to 0.03 mm. The lower limit lies at around 0.005 mm. per revolution. With lesser advance the ice is heated too much; at advances above the optimum value the action of the agitator is akin to milling and produces an ice-snow or granular finished product.

After the agitator 11 has reached the bottom of its stroke, it should be moved back upward at a faster rate than it was moved down, but the upward stroke need not be hurried because it provides a certain amount of whipping action. However, once the downward stroke has been completed the agitator should not continue to work on the material for too long, lest it produce unnecessary heat of friction. Preferably the temperature of the finished product should be about −6° C. When the container 12 is installed on the machine, the temperature of the solidly frozen body 13 of material is of course substantially below −6° C.

An essential factor in the preparation of a good soft-ice product is pressurization of the interior of the container 12 with gas or air to be whipped into the material as the machine acts upon it. Pressure in the container should be in the range of 0.5 to 5 bar above atmospheric, preferably about 2 bar.

Some pressurization of the container 12 can be achieved by forming the annular resilient sealing member 15 with an axially deep circumferential surface that fits closely in the upper portion of the insulating holder 14, so that the sealing member 15, in entering the holder, acts as an air compressing piston. It is considered more effective, however, to introduce additional pressure gas or pressure air into the container 12 after it is installed on the machine, and a compressed gas cartridge can be used for this purpose. However, the preferred pressurizing expedient is to provide a small diaphragm-type air pump 91 in the upper compartment of the housing, having a reciprocable plunger 92 that is actuated by an eccentric 93 on the outer driver 27, just above the pulley 30 and against which the outer end of the plunger 92 bears. Pressure air from the pump 91 is conducted down to the sealing member 15 by way of a small flexible hose 94. A passage conjointly defined by the sealing member 15 and the housing conducts the air from the hose 94 downwardly around the agitator shaft 16 (FIG. 2) to a thin, concentric flexible lip portion 95 of the sealing member 15, at the underside thereof. The flexible lip seal 95, which is resiliently biased towards circumferential engagement with the agitator shaft 16, prevents mix material from escaping upwardly along the agitator shaft into other parts of the machine and acts as a check valve that maintains positive pressure in the container 12. Pressure air that flows into the container normally maintains the sealing lip 95 out of contact with the agitator shaft 16, thus eliminating heat due to friction at this point. Because of the radially inward bias of the circumferential sealing lip 95, pressure on the feed side of that lip is about 0.3 bar higher than in the container 12, ensuring a downward air flow along the agitator shaft 16 that helps to keep it clean.

As pointed out hereinabove, the container 12 should initially be filled only partway with mixture, to provide for overrun. The volume of the space above the frozen body 13 is preferably equal to 50% of the volume of mixture. To some extent the amount of overrun (airiness of the finished product) can be varied by varying the pressure of air in the container 12 during mixing.

To avoid possible dangerous consequences of having compressed air trapped in the container 12, the upper portion of the holder 14, which is received in an annular downwardly projecting closure means 98 on the housing 6, has a helical groove 99 that receives fixed lugs 100 on the closure means. The holder 14 can thus be unscrewed from the housing, venting the working space for release of compressed air while the lugs 100, in cooperation with the groove 99, prevent the holder from being thrust suddenly downward by air pressure in it.

To releasably secure the holder 14 against rotation on the housing, the closure means 98 on the housing has an axially slidable safety pin 102 that extends radially relative to the agitator shaft 16 and is biased towards it. The radially inner end of the safety pin 102 is receivable in a blind hole 104 in the holder 14, being engaged in that hole with a detent action when the holder is fully installed on the housing and being manually withdrawable therefrom to permit removal of the holder from the housing. The holder 14 may be provided with a radially projecting handle 105 that facilitates rotating it to and from its installed position on the housing. The safety switch 77, which is actuated by the upright pin 78, is in its closed condition only when the holder 14 is fully installed on the housing.

From the foregoing description taken with the accompanying drawings it will be apparent that this invention provides a method and means for making a smooth-textured, uniform soft-ice, substantially without granular particles, from a mixture of water or milk and a commercially available soft-ice powder that has been frozen to a solid body of ice-like material. It will be further apparent that the apparatus of this invention comprises novel means whereby an agitator or the like that rotates in one direction at a constant substantially high speed is advanced very slowly in one axial direction through a predetermined stroke and then, while it continues in such rotation, is moved in the opposite direction at a faster speed, reversal of axial agitator movement being effected automatically, and shut-off of the drive motor at the end of a processing cycle also being automatic.

What is claimed as the invention is:

1. Apparatus for making soft-ice, comprising:
   A. a container having a substantially cylindrical interior, said container being open at one end thereof and adapted to be partially filled with soft-ice mix that is frozen to a body of substantially solid and unfrothed material spaced from said end thereof;
   B. means for mounting said container in coaxial relation to an upright shaft that is tubular along a substantial portion of its length;
   C. elongated blade-like scraping and agitating means carried by said shaft at a bottom end thereof and extending radially therefrom, having a radius substantially equal to the inside radius of the container and
      (1) having a substantially thin leading edge whereby localized force is applied to frozen material in the container in consequence of rotation and axial advance of the shaft relative to the container, which force momentarily melts said material in a moving zone adjacent to said leading edge that progresses through the body of material, and
      (2) having agitator portions behind said leading edge whereby momentarily melted material is deflectingly agitated by rotation of the shaft; and
   D. means for causing said shaft to rotate at high speed and to advance axially at a slow, steady rate relative to the container, comprising
      (1) an elongated tubular outer driver coaxially surrounding the shaft above said bottom end thereof, said outer driver
         (a) being confined to rotation and
         (b) having a splined connection with the shaft whereby the shaft is constrained to rotate with the outer driver but is axially slidable relative thereto,
      (2) means for rotating said outer driver in one direction and at a substantially constant rate,
      (3) an inner driver
         (a) confined to rotation coaxially with the shaft and the outer driver and
         (b) having an elongated portion which extends into the shaft and which has a threaded connection with the shaft whereby the shaft is moved axially relative to the drivers in consequence of relative rotation between the drivers, and
      (4) means for rotating the inner driver in said one direction and, alternatively and selectably,
         (a) at a speed slower than said substantially constant rate, for moving the shaft axially in one direction, and
         (b) at a speed faster than said substantially constant rate, for moving the shaft axially in the opposite direction.

2. The apparatus of claim 1, further characterized by:
   (1) said means for rotating said inner driver comprising
      (a) a pair of drive belts, one for each of said speeds, each cooperable with pulleys on said inner driver and on a driving member for imparting rotation at its speed to said inner driver, and
      (b) belt tensioning means cooperable with said belts to tension them alternatively, said belt tensioning means being shiftable between
         (1) a lowering position in which one of said belts is tensioned around its pulleys to impart downward movement to said shaft and
         (2) a raising position in which the other of said belts is tensioned around its pulleys to impart upward movement to said shaft;
   (2) means biasing said belt tensioning means towards its raising position;
   (3) latch means engageable with said belt tensioning means to releasably confine the same in its lowering position;
   (4) an enlarged diameter upper portion on said shaft, constrained to rotation and axial motion therewith and which provides said splined connection with the outer driver and has a downwardly facing abutment surface; and
   (5) release means connected with said latch means and arranged to be engaged by said abutment surface for disengaging the latch means from said belt tensioning means when said shaft reaches a predetermined point in its downward axial movement.

3. The apparatus of claim 2 wherein said driving member is driven by an electric motor and wherein said upper portion on said shaft has an upwardly facing abutment surface, further characterized by:
   switch means connected with said electric motor and arranged to be actuated by said upwardly facing abutment surface when said shaft reaches a predetermined point in its upward movement, for turning off the motor.

4. The apparatus of claim 1, further characterized by:
   E. sealing means removably securable across said one end of the container and surrounding the shaft, to provide a substantially gas tight closure for the container; and
   F. means for forcing gas under pressure into the interior of the container when the same is closed, for mixture with momentarily melted material during the agitation thereof.

5. Apparatus for making soft-ice, comprising:
   A. a container having a substantially cylindrical interior, said container being open at one end thereof and adapted to be partially filled with soft-ice mix that is frozen to a body of substantially solid and unfrothed material spaced from said end thereof;
   B. means for mounting said container in coaxial relation to a shaft;
   C. elongated blade-like scraping and agitating means carried by the shaft and extending radially therefrom, having a radius substantially equal to the inside radius of the container and
      (1) having a substantially thin leading edge whereby localized force is applied to frozen material in the container in consequence of rotation of the shaft and relative axial advance between the shaft and the container, which force momentarily melts said material in a moving zone adjacent to said leading edge that progresses through the body of material, and
      (2) having agitator portions behind said leading edge whereby momentarily melted material is deflectingly agitated by rotation of the shaft;
   D. power drive means for causing the shaft to rotate in one direction at a substantially high speed and for effecting relative axial advance between the shaft and the container at a substantially steady rate which is low enough to ensure that all frozen material engaged by said scraping and agitating means is momentarily melted and which is less than 0.1 mm per revolution of the shaft;

E. sealing means removably securable across said one end of the container and surrounding the shaft, to provide a substantially gas tight closure for the container; and F. means for forcing gas under pressure into the interior of the container when the same is closed, for mixture with momentarily melted material during the agitation thereof.

6. The apparatus of claim 5, further characterized by: said power driving means being arranged to rotate said shaft at a speed such that the average circumferential velocity of said blade-like scraping and agitating means is on the order of 1.7 to 5.3 m. per second.

7. Apparatus for making soft-ice, comprising:

A. container having a substantially cylindrical interior, said container being open at an upper end thereof and adapted to be partially filled with soft-ice mix that is frozen to a body of substantially solid and unfrothed material;

B. means for mounting said container in coaxial relation to an upright shaft;

C. elongated blade-like scraping and agitating means fixed to said shaft at the bottom thereof and extending radially therefrom, having a radius substantially equal to the inside radius of the container and (1) having a substantially thin leading edge whereby localized force is applied to frozen material in the container in consequence of rotation of the shaft in one direction and relative axial advance between the shaft and the container, which force momentarily melts said material in a moving zone adjacent to said leading edge that progresses through the body of material, and (2) having agitator portions behind said leading edge whereby momentarily melted material is deflectingly agitated by rotation of the shaft; and D. means for actuating said shaft comprising rotational drive means and further comprising (1) first transmission means providing a rotational driving connection between said rotational drive means and said shaft whereby the latter is driven for rotation in said one direction (a) with a rotational force adequate to effect momentary melting of said material and (b) at a rotational speed consistently high enough to produce whipping of momentarily melted material, and (2) second transmission means connected with said rotational drive means for effecting relative axial advance between said shaft and the container at a rate which has a predetermined relationship to said rotational speed and which is low enough to ensure that all frozen material through which said scraping and agitating means moves is momentarily melted and which, by its constancy, ensures momentary melting and whipping of substantially all of the frozen material in the container.

8. The apparatus of claim 7 wherein said drive means and said first transmission means are arranged to cooperate in rotating said shaft in said direction at a speed such that the average circumferential velocity of said blade-like scraping and agitating means is substantially higher than 1 m/sec.

9. The apparatus of claim 7 wherein said drive means and said second transmission means are arranged to cooperate in effecting relative axial advance between said shaft and the container at a rate substantially less than 1 mm per revolution of the shaft.

10. The apparatus of claim 7, further characterized by:

E. sealing means removably securable across said open end of the container and around said shaft, to provide a substantially gas-tight closure for the container; and F. means for forcing gas under pressure into the interior of the container when the same is closed.

* * * * *